Nov. 7, 1939. J. M. BIERER 2,179,443
METHOD AND APPARATUS FOR VULCANIZING STRIP MATERIAL
Filed May 22, 1937 3 Sheets-Sheet 2
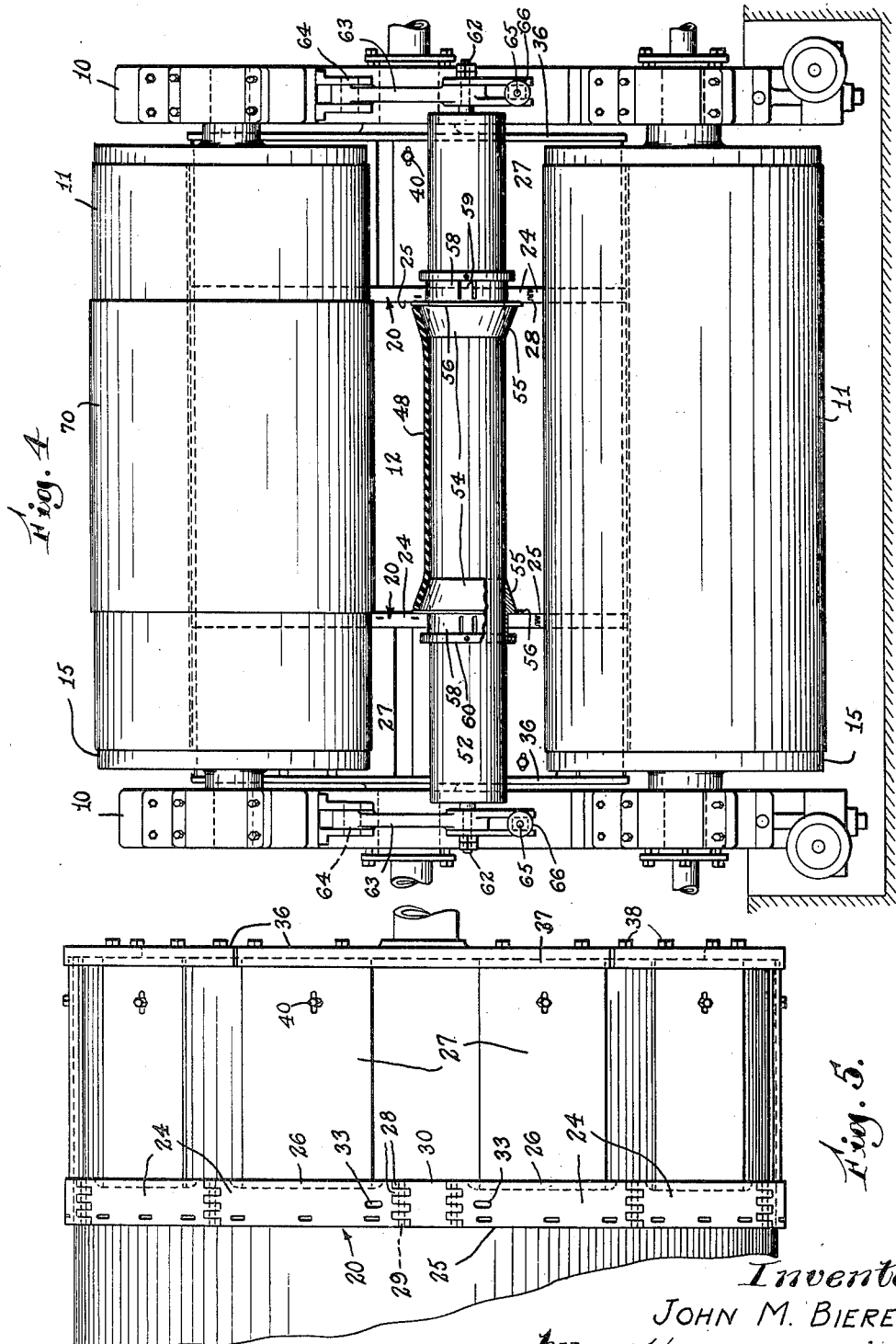
Inventor
JOHN M. BIERER
by Kenway & Witter
Attorneys Nov. 7, 1939.  J. M. BIERER  2,179,443
METHOD AND APPARATUS FOR VULCANIZING STRIP MATERIAL
Filed May 22, 1937  3 Sheets-Sheet 3
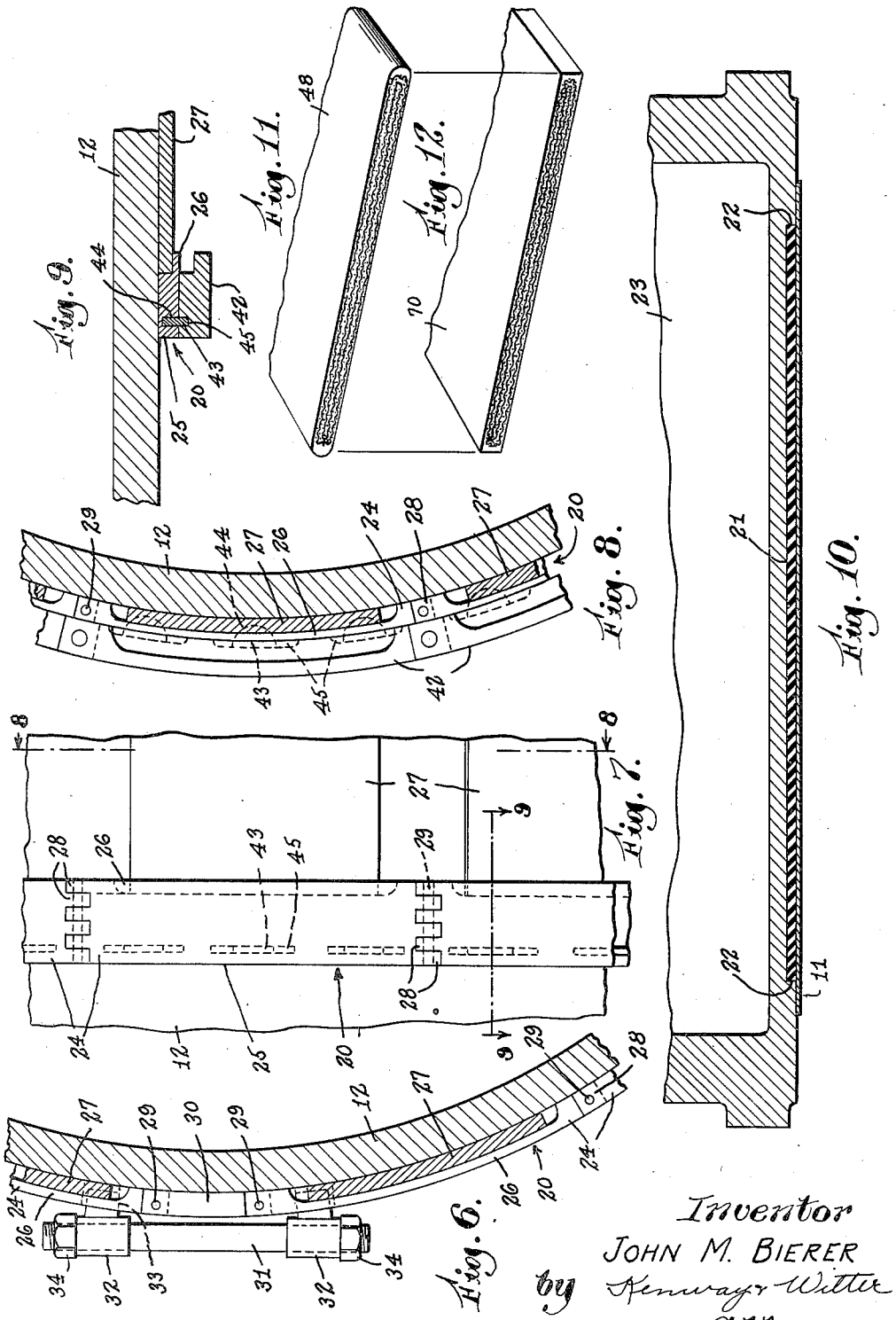
Inventor
JOHN M. BIERER
by Kenway & Witter
Attorneys Patented Nov. 7, 1939

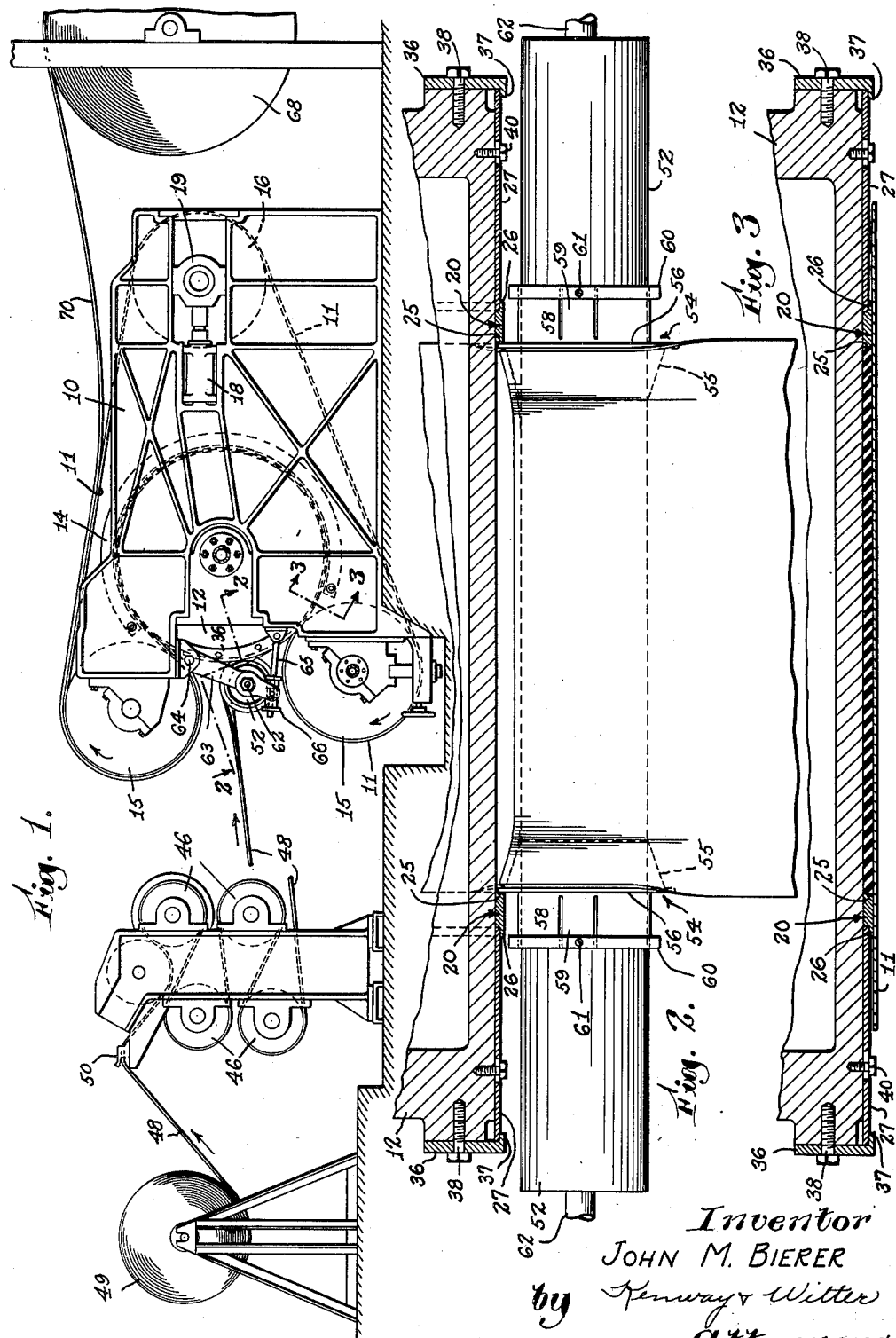

2,179,443

UNITED STATES PATENT OFFICE 2,179,443

METHOD AND APPARATUS FOR VULCANIZING STRIP MATERIAL

John M. Bierer, Waban, Mass., assignor to Boston Woven Hose & Rubber Company, Cambridge, Mass., a corporation of Massachusetts Application May 22, 1937, Serial No. 144,184

12 Claims. (Cl. 18—6)

This invention relates to a method and apparatus for vulcanizing strip material under pressure and more particularly to the manufacture of conveyor belting. Such belting is relatively thick and is constructed of several plies of fabric covered on both faces and both edges with rubber, the purpose of the cover being to protect the belting against wear and to seal the fabric against the ingress of moisture which would cause rapid deterioration. Heretofore the vulcanizing of the rubber covers, on both faces and edges, has presented considerable difficulty due particularly to the forming of air blisters and press overlaps, and the proper forming and vulcanizing of the edges to withstand the necessary wear and tear has presented an even greater problem, it being understood that conveyor belting is particularly subject to damage and deterioration from the edges which may strike and rub against conveyor structures and guiding devices in use. The primary object of my invention resides in the production of a novel method and apparatus for vulcanizing the rubber covers of belting and more particularly for properly forming and vulcanizing the edges of the belting in a superior manner eliminating these difficulties.

My invention contemplates not only the continuous curing of the belting in a manner eliminating the said blisters and press overlaps, but furthermore the curing of such belting to an absolutely uniform and predetermined width and thickness and the formation of full and completely protected and thoroughly vulcanized edges. In practising the invention, I preferably start with uncured belting of a width greater than the width of the cured belting and I feed the uncured belting into a continuous trough-like molding channel having a bottom wall and side walls. The said walls are moved along longitudinally during the feeding movement and an enclosing top wall is applied thereto and the belting placed under pressure at all four walls and thus molded to the proper width and thickness. The channel walls together with the belting is thereupon continued through a predetermined vulcanizing path whereat the belting is vulcanized on all four sides while thus confined. The belting is furthermore placed under predetermined tension and held in that condition during vulcanization.

In the preferred embodiment of the invention, I employ a continuous molding channel of fixed predetermined width and I feed into this channel during longitudinal movement thereof the two edge portions of the uncured belting to be vulcanized while permitting the intermediate portion thereof to bulge or bow transversely outwardly. A top wall, preferably in the form of an endless pressure band, is progressively engaged against the bowed portion of the belting and crowds it into the channel, the belting being thus confined within the four walls and vulcanized during passage thereof through a predetermined path. The crowding of the belting into the channel fully fills the channel under pressure and crowds the edge portions of the belting into intimate contact with the side walls, and these walls serve both to mold the edges of the belting to full and uniform shape and to apply heat thereto whereby completely vulcanizing the same.

A suitable apparatus for practising the preferred method employs a vulcanizing drum provided with a circumferential molding channel therein of predetermined depth and width and an endless pressure band cooperating therewith. The channel may be formed directly within the drum or may be constructed of independent pieces cooperating therewith and arranged to provide variations in depth and width, all as hereinafter more specifically described. Also cooperating with the drum are means for tensioning the belting and means for feeding into the channel the two edge portions of the tensioned belting while permitting its intermediate portion to bulge outwardly, the band being arranged thereafter to engage the bulged out portion of the belting and crowd it into the channel at the bite formed by the band with the drum. The band thereupon comes into contact with the drum over the channel whereby forming a closing top wall for the channel during passage of the belting with the drum through a predetermined vulcanizing path. The arrangement is such that the tensioned belting is fed continuously into the channel, is crowded thereinto under heavy pressure completely filling the channel and bringing the edge portions of the belting into full and intimate contact with the edge walls of the channel, and is fully and completely vulcanized to the exact shape of the channel during its passage with and around the drum.

These and other features of the invention will be best understood and appreciated from the following description of a preferred embodiment thereof selected for purposes of illustration and shown in the accompanying drawings in which, Fig. 1 is a side elevation of a machine embodying my invention, Fig. 2 is an enlarged fragmentary plan view thereof taken on line 2—2 of Fig. 1, Fig. 3 is a further enlarged sectional view taken on line 3—3 of Fig. 1, Fig. 4 is a front elevation of the machine, Fig. 5 is an elevation of one end of the vulcanizing drum, Fig. 6 is a fragmentary sectional view through the vulcanizing drum, illustrating the manner of applying the channel-forming rings thereto, Fig. 7 is a fragmentary elevation of the vulcanizing drum, showing a segmental ring thereon Fig. 8 is a sectional view taken on line 8—8 of Fig. 7, Fig. 9 is a sectional view taken on line 9—9 of Fig. 7, Fig. 10 is a fragmentary sectional view through a modified form of vulcanizing drum, Fig. 11 illustrates a portion of uncured belting, and Fig. 12 illustrates the same belting after being treated in accordance with my invention.

Conveyor belting ordinarily comprises a plurality of plies of fabric having both faces and both edges covered with rubber as a protection against wear and to prevent moisture from reaching the fabric, the finishing of the edges of the belting being particularly important as a protection against damage caused by the belting striking against conveyor structures, guiding devices, etc. Heretofore such belting has been vulcanized on both faces and both edges in a flat press, the edges being treated by long side irons placed between the two platens and brought into contact with the edges of the belting while its two faces are engaged by the platens. Such treatment is not only difficult to perform but the inability to locate the side irons accurately and the intermittent character of the treatment produce a belting having imperfect edges and one in which blistering, particularly at the press overlaps, is a serious defect. In this intermittent treatment, the soft rubber covers are so deeply indented by the pressure of the hot platens that rubber forced out from beneath the platens forms into a lump or semi-cured area just outside the press. This area usually contains entrapped air and in its subsequent vulcanization such air, as well as air entrapped in other portions of the belting, tends to cause blisters and serious defects. In accordance with my improved method, the belting is placed continuously under pressure in a mold of predetermined dimensions and is vulcanized continuously on both faces and both edges to such dimensions, whereby producing a belting of uniform character and size throughout and wherein the defects and objections present in such belting heretofore produced are eliminated.

My novel method of shaping and vulcanizing such belting is best shown in the accompanying drawings wherein I have illustrated a suitable machine for practising the method. The heavy metal frame of the machine comprises side members 10 of similar shape rigidly connected and suported upon a concrete foundation. The frame is designed to support three rolls over which passes a relatively wide steel tension band 11 in a generally triangular path with a re-entrant loop extending about the periphery of a large vulcanizing drum or cylinder 12 supported by the frame within the general outline of the path of the band. The vulcanizing drum 12 is steam heated and cooperating with a relatively large segmental portion thereof is a steam heated jacket 14. Two of the band supporting rolls are located adjacent to and forwardly of the vulcanizing drum at 15 and a third roll 16 is located rearwardly of the drum, the tension band being supported on these rolls and engaging the drum beneath the jacket 14. The band is brought to and held under the desired tension by hydraulic pressure in pressure cylinders 18 acting against the bearings 19 for the roll 16. The drum is rotated slowly in the direction indicated by the arrow and the strip to be vulcanized is fed into the bite formed between the band and the drum as the band leaves the lower roll 15.

The vulcanizing drum is provided with one or more open channels extending continuously therearound and each bounded on three sides by a bottom wall and two side walls. In Figs. 2–6 of the drawings I have illustrated the cylindrical surface of the drum as providing the bottom wall and rings 20 as providing the side walls of this channel, although the channel may be otherwise formed, as directly within the drum and without the use of rings for example, such a channel being illustrated in Fig. 10 wherein the bottom wall 21 and the side walls 22 are integral with the drum 23. The use of the rings provides for a variation in the width as well as the depth of the channel, all as hereinafter described. Furthermore, for open side presses the rings may be of one piece construction, but otherwise they will preferably be formed in sections which may be placed on and removed from drums suported at both ends in the press.

The rings 20 are preferably constructed in segments, as illustrated, each segment 24 thereof being curved to fit the drum and having an inner edge wall 25, the outer edges being rabbetted to provide overhanging flanges 26 for engaging spacing plates 27. The ends of the segments are notched to provide interlocking fingers 28 and the fingers are perforated to receive pintles 29. The ring segments are applied to the drum and interlocked together and the gap between the two ends is filled by a short segment 30 of exactly the necessary length. This short segment is applied by the means and in the manner illustrated in Fig. 6. This means comprises a bolt 31 threaded at its ends and carrying elements 32 having lugs adapted to project into recesses 33 in the segments. Tightening of the nuts 34 draws the ring tightly onto the drum and brings the perforations into alignment whereupon the pintles 29 are inserted.

As illustrated in Figs. 2 and 3, two such rings mounted in spaced relation on the vulcanizing drum provide a channel of predetermined width therebetween and the following described means prevents outward movement of the rings along the drum. A spacing plate 27 is provided for each ring segment 24 and the inner end of this plate rests beneath the flange 26 and abuts against the ring segment. The outer ends of the plates are engaged by end stop plates 36 having flanges 37 overhanging the plates 26 and bolted to the drum at 38. Screws 40 are provided for supporting the plates 26 while the stop plates are being applied. It will be apparent that the plates 26 and 36 serve to hold the rings to the original predetermined spacing on the drum and it will also be apparent that this spacing may be varied by substituting plates 26 of different lengths.

Belting of predetermined different thickness may also be produced in accordance with my invention by using channel-forming rings of different thickness or by building up the rings to greater and predetermined thickness by superposing the proper combinations of rings one upon another. In Figs. 7–9 I have illustrated a second ring embodying segments 42 as superposed on the ring embodying segments 24, it being noted that the segments 24 and 42 are alike except for the difference in thickness. The outer ring is prevented for movement on the inner ring longitudinally of the vulcanizing drum by the use of keys 43 carried within key slots 44 in the segments 24 and extending into keyways 45 in the segments 42, the keyways 45 being longer than the keys whereby permitting the outer ring segments to move circumferentially when tightening the same by means of the tool 31. It will be understood that channels of any predetermined depth may be formed by combining rings of a combined thickness to produce such depth.

The open channel above described provides the bottom and two side walls of a mold and the tension band 11 is arranged to form the top wall thereof. The production of a satisfactory belting furthermore requires that the mold shall be completely filled and the belting brought firmly into intimate contact with the mold walls throughout their entire areas and especially at the side walls thereof which form the edges of the belting. As illustrated in the drawings, I accomplish this important step by crowding the uncured belting, preferably of a width greater than the width of the mold channel, into the channel, first feeding the two edges of the belting into the channel and thereafter crowding the intermediate portion thereinto by engaging the tension band therewith, the belting being thereupon molded into intimate contact with the side walls 25. During such feeding of the edges into the channel the intermediate portion of the belting is permitted to bulge outwardly and subsequently the tension band crowds the belting wholly into the channel under heavy pressure and provides the top wall of the mold, whereby enclosing the belting at all four sides. These steps and the vulcanizing of the belting while wholly enclosed and under presure are furthermore carried out continuously whereby producing a belting uniform in dimensions and character throughout.

In addition to treating the belting as above described, it is also desirable that it shall be vulcanized under a condition of predetermined tension and for this purpose I may employ a plurality of tensioning rolls 46 of the nature described in Reissue Patent No. 19,660. The uncured belting 48 (Figs. 1 and 11) passes from a roll 49 through a guide 50 and over the tensioning rolls 46, and from thence to a feeding roll 52 located adjacent to the open portion of the molding channel and forwardly of the bite formed by engagement of the tension band 11 with the vulcanizing drum.

Mounted on the roll 52 adjacent and opposite to the channel forming rings 20 are two elements 54. These elements have conical surfaces 55 facing each other, flanges 56 extending into the molding channel and respectively in contact with the side walls 25, and outwardly extending sleeve portions 58. The sleeve portions are slitted to provide a flexible leaf 59 integral with each element and a ring 60 surrounding each sleeve portion has a screw 61 threaded thereinto and engaging the leaf 59. Tightening of these screws is adapted to bind the elements against movement relative to the roll 52. This roll is rotatably supported at its ends 62 by two arms 63, pivoted to the frame at 64, the lower ends of the arms being engaged by rods 65 anchored to the frame and provided with adjusting means 66 whereby the roll may be anchored in adjusted proximity to the drum.

The operation of this novel method and apparatus is now believed to be obvious. The belting 48 being treated passes from the roll 49, around the tensioning rolls 46, over the feeding roll 52, around and in contact with the vulcanizing drum beneath the jacket 14, and from thence to the wind-up roll 68, the belting being drawn along by power applied to the vulcanizing drum. The tensioning rolls serve to place the belting under a predetermined tension and as it passes over the roll 52 the conical surfaces 55 elevate the edges and permit the intermediate portion to sag, especially since the belting is under tension, as illustrated in Fig. 2. The elements 54 thereupon act to feed the edge portions of the belting into the molding channel while permitting the intermediate portion to bulge outwardly. The belting thereupon passes into the bite formed between the tension band and the drum whereupon the tension band engages the bulged portion of the belting and forces it into straight alignment transversely and into the channel. The belting is thus crowded into and completely fills the molding channel, particularly at the side walls, and the band 11 thereupon becomes the top wall of the mold completely enclosing the belting within the channel. The belting, now in vulcanizing contact with the mold on both faces and edges, passes through the vulcanizing path beneath the jacket 14 and is thoroughly and completely vulcanized. The finished belting 70 (Fig. 12) is somewhat narrower than the uncured belting 48 and its edges are fully and completely formed and protected by a substantial rubber coating.

It will be apparent that, in accordance with my invention, uncured belting wider than the finished belting is continuously fed into a mold channel having a bottom wall and side walls, an enclosed top wall is then applied to the channel and the belting placed under pressure on all four of said walls and thereby molded to predetermined width and thickness. The edges of the belting are particularly molded into full and intimate contact with the side walls of the channel by the relative approaching movement between such edges and the side walls when the belting is placed under pressure within the enclosed mold. Furthermore, while I have herein particularly illustrated and described this action as brought about by feeding the relatively wider uncured belting in bowed condition into a mold having fixed side walls and thereafter pressing the belting into the mold in a manner causing its edges to approach the side walls, it will be apparent that the converse treatment of moving the side walls into molding contact with the edges of the belting is within the scope of the invention.

The apparatus illustrated and described but not claimed herein, and relating more particularly to the vulcanizing drum and the open channel formed therein and with which cooperates the tension band 11 to provide a top wall for the channel, is the invention of Walter J. Baker and is described in and claimed in his copending application No. 166,802, filed Oct. 1, 1937.

Having thus described my invention what I claim as new and desire to secure by Letters Patent of the United States is,

1. A method of shaping and vulcanizing belting under pressure, which consists in feeding into a trough-like channel having a bottom wall and side walls the two edge portions of belting of such width that its intermediate portion is bowed transversely outwardly where the belting thus enters the channel, progressively crowding said bowed portion of the belting during feeding movement thereof into the channel by engaging a top wall therewith, and vulcanizing the belting while holding it confined within said walls.

2. A method of continuously shaping and vulcanizing belting under pressure, which consists in continuously feeding into an endless trough-like channel having a bottom wall and side walls the two edge portions of belting of such width that its intermediate portion is bowed transversely outwardly where the belting thus enters the channel, moving said walls continuously in belting-feeding direction, crowding said bowed portion of the belting into the channel during feeding movement thereof by engaging a top wall therewith and moving the top wall along in cooperation with the bottom and side walls, and vulcanizing the belting while holding it confined within the said walls and during passage therewith through a predetermined path.

3. A method of shaping and vulcanizing belting under pressure in a mold channel of predetermined width, which consists in progressively feeding into an open side of the mold channel the two edge portions of belting wider than the channel while moving the belting and mold longitudinally, crowding the remaining portion of the belting into the channel progressively during such movement by engaging a wall of the mold therewith and moving the wall into position closing said open side of the channel all during said longitudinal movement of the belting and mold, and vulcanizing the belting while holding it confined within the mold channel and during its passage with the mold through a predetermined path.

4. A method of shaping and vulcanizing belting under pressure and predetermined tension in a mold channel of predetermined width, which consists in placing belting under predetermined tension, progressively feeding into an open side of the mold channel the two edge portions of the belting under said tension while moving the belting and mold longitudinally and permitting the intermediate portion of the belting to bulge outwardly, crowding the intermediate portion of the belting into the channel progressively during such movement by engaging a wall of the mold therewith and moving the wall into position closing said open side of the channel all during said longitudinal movement of the belting and mold, and vulcanizing the belting while holding it confined within the mold channel and during its passage with the mold through a predetermined path.

5. A method of continuously shaping and vulcanizing belting under pressure to predetermined width and thickness, which consists in continuously feeding into a trough-like channel having a bottom wall and side walls and a normally open top uncured belting of a width greater than said predetermined width, thereafter continuously applying an enclosing top wall to said channel and molding the edges of the belting under pressure by causing a relative approaching movement between each edge of the belting and the adjacent side wall of the channel, and continuously vulcanizing the belting on all four of said walls while passing it through a predetermined vulcanizing path and holding it confined under pressure against said walls and to said predetermined width and thickness.

6. A machine for shaping and vulcanizing strip material, comprising a vulcanizing cylinder having a channel extending continuously therearound and bounded on three sides by a bottom wall and side walls, means cooperating with the side walls for progressively feeding into the channel the two edge portions of a strip wider than the channel while rotating the cylinder and permitting the intermediate portion of the strip to bulge outwardly, and a tension band passing around the cylinder and forming a bite therewith, the band being arranged to crowd the bulging portion of the strip into the channel at and forwardly of said bite and provide a closing top wall for the channel during the passage of the strip therewith through a predetermined vulcanizing path.

7. The machine defined in claim 6 wherein said means comprises oppositely disposed inclined surfaces for bending the edge portions of the strip inwardly of the channel, and flanges cooperating with the side walls for directing the said edge portions into the channel.

8. The machine defined in claim 6 wherein said means comprises oppositely disposed conical surfaces mounted for rotation and arranged to bend the edge portions of the strip inwardly of the channel as the strip rides thereover, and annular flanges at the outer ends of the conical surfaces cooperating with the side walls to direct the edge portions of the strip into the channel.

9. A machine for shaping and vulcanizing strip material, comprising a vulcanizing cylinder having a channel extending continuously therearound and bounded on three sides by a bottom wall and side walls, a strip feeding roller disposed adjacent to and opposite of the channel and having annular flanges extending into the channel at the side walls and raised portions adjacent to and inwardly of the flanges for directing the edge portions of a strip into the channel, and a tension band passing around the cylinder and forming a bite therewith beyond the roller, the band being arranged to crowd the intermediate portion of the strip into the channel at and forwardly of said bite and provide a closing top wall for the channel during passage of the strip therewith through a predetermined vulcanizing path.

10. A machine for vulcanizing rubberized strip material, comprising a vulcanizing cylinder having a channel extending continuously therearound and bounded on three sides by a bottom wall and sidewalls, strip tensioning means located in alignment with the channel and in spaced relation to the cylinder, an endless tension band passing around the cylinder and forming a bite therewith, and a feeding roller having annular flanges cooperating with the side walls of the channels in position to guide tensioned strip material from the tensioning means into the channel in advance of the bite.

11. In a vulcanizing machine, a vulcanizing cylinder having a channel extending continuously therearound and bounded on three sides by a bottom wall and side walls, a strip feeding roller parallel with the cylinder and located adjacent to the channel, and a pair of conical elements in spaced relation on the roller, said elements tapering inwardly toward each other and each having an annular flange cooperating with the adjacent side wall of the channel.

12. The machine defined in claim 11 wherein said conical elements are adjustable on and along the roller, and means for securing the elements in adjusted position.

JOHN M. BIERER.